Patented Oct. 13, 1953

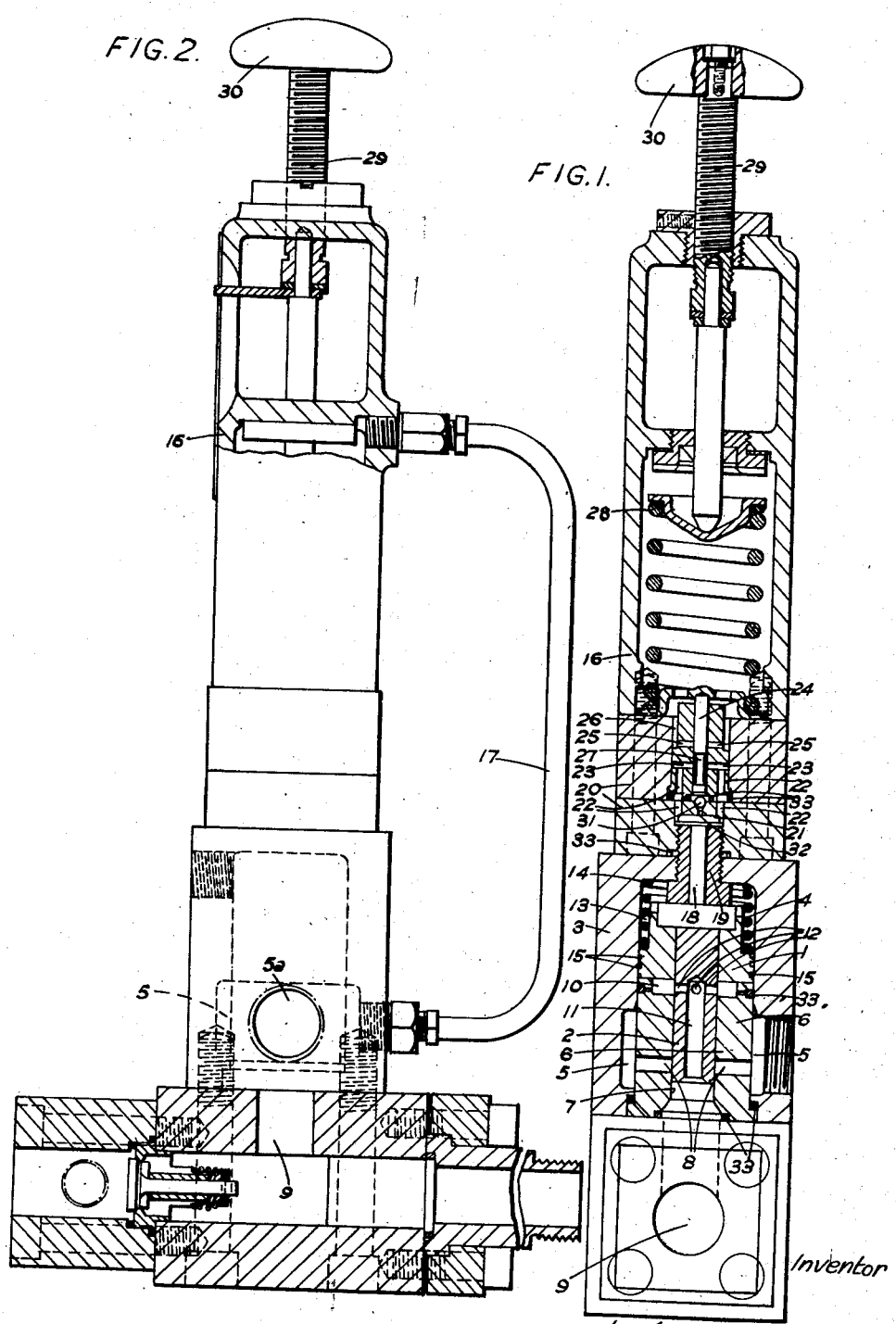

2,655,174

UNITED STATES PATENT OFFICE 2,655,174

PILOT CONTROLLED PRESSURE RELIEF VALVE

John Maurice Towler, Harrogate, and Frank Hathorn Towler, Otley, England, assignors to Electraulic Presses Limited, Rodley, England, a corporation of England Application January 12, 1946, Serial No. 640,928
In Great Britain February 1, 1945

4 Claims. (Cl. 137—489)

This invention relates to fluid pressure operated automatic piston valves, preferably of the packingless piston type in which fluid tightness is maintained by making the piston a very close sliding fit in the bore of the valve body and in which oil is the pressure fluid.

One object of this invention is to provide a pilot-operated valve of improved construction of the type described above which can be operated by pressure fluid from one source so that it controls the flow of the pressure fluid by which it is operated, such valve being capable of functioning as a relief valve or reducing valve or pump unloading valve or bypass valve.

Broadly the present invention consists of an automatic fluid pressure operated control valve wherein the valve member controls an outlet for the escape of the operating fluid and is operated by a piston which on one side is spring loaded to maintain the valve member in the position where the outlet is closed and on the opposite or pressure side is in permanent communication with the inlet for the operating pressure fluid. A restricted passage is provided for the flow of pressure fluid from the pressure side of the piston to the spring side and valve means permit fluid to escape from said opposite side of the piston at a rate to cause a difference of pressure to be created across the piston sufficient to move it in opposition to the opposing spring load and so bring about the opening of the outlet controlled by the valve member, with the resulting escape of pressure fluid from the pressure side of the piston until the piston again becomes hydraulically balanced to permit the spring to return the piston and valve member to their normal position, thereby to close said outlet.

The nature of the valve means for permitting the escape of pressure fluid from the spring side of the piston is determined by the use to which the improved valve of the present invention is to be put. For instance if a spring loaded relief valve is employed arranged to blow off at a predetermined pressure the improved valve will function as a relief valve. If, however, a small bypass valve is substituted for or added to the spring loaded relief valve, the improved valve will function as a pilot operated bypass valve. Alternatively if the main outlet is connected to a machine to which reduced pressure is to be supplied and a small reducing valve is connected between the space on the spring loaded side of the piston and the main outlet, the improved valve will then function as a pilot operated reducing valve.

The valve serving to permit fluid to escape from the spring loaded side of the piston and bring about a pressure difference across the piston may either be manually operated, pressure operated or electrically operated and, as explained, the function of the improved valve, hereinafter referred to as a pilot-operated valve is determined by the nature of said bypass valve.

In order that the invention may be clearly understood and carried into effect a bypass valve according to the above embodiment will now be described by aid of the accompanying drawings in which:

Fig. 1 is a vertical section through the same and

Fig. 2 is a view, partly in section, of the same valve, taken at right angles to Fig. 1 showing the pressure fluid inlet in detail and a connection for returning to exhaust the fluid that escapes past the small relief valve.

In the pilot-operated valve illustrated in the drawings the piston is indicated by the reference numeral 1 and the valve plunger by the numeral 2. These two parts are made separately and are joined together so as to move as one piece by making the plunger 2 a force fit in the piston 1 so that the portion constituting the plunger proper depends from beneath the piston with their axes coincident.

Similarly the valve body is also made in two pieces and fitted one within the other. The outer valve body is indicated at 3 and provides a bore 4 for the piston 1 and an exhaust annulus 5, whilst the inner valve body is indicated at 6 and provides a bore 7 for the plunger 2 and radial holes 8 near the lower end of the bore 7 serving as means for connecting the said bore with the exhaust annulus 5. In the normal position of the piston the plunger 2 closes the inner ends of the radial holes 8 and thus isolates the bore 7 from the annulus 5.

The bore 7 below the plunger 2 is permanently open to the inlet 9 for the pressure fluid and said liquid is similarly free to have permanent access to a space 10 beneath the piston 1 by way of a passage 11 extending up through the centre of the plunger and communicating at its upper end with the said space 10 by means of radial passages 12.

On the upper side of the piston the bore 4 provides a further space 13 which contains a light spring 14 serving to press the piston downwards with a suitable pressure. The spaces 10 and 13 communicate with each other, in the illustrated example, by means of a helical groove 15 around the outside of the piston said groove being proportioned to provide a restricted passage through which the pressure fluid may flow normally to maintain the piston in hydraulic balance.

For the valve to operate it is necessary that pressure fluid be permitted to escape from the space 13 when the pressure in said space attains a predetermined figure and for this purpose valve controlled means of communication are provided between the space 13 and the interior of a spring housing 16 which in turn is connected to the exhaust outlet of the aforesaid annulus 5 by means of the pipe 17 shown in Fig. 2. These means of communication in the illustrated example comprise a hole 18 extending axially through the centre of a thimble 19 forming a means of connection between a two-piece upper valve body 20 and the main outer valve body 3. This hole 18 communicates at its upper end with a space 21 from which lead upwards further drilled passages 22 that break into radial passages 23. These radial passages in turn open at their inner ends into a bore for a plunger 24. At a higher level in the length of this bore further radial passages 25 provide a communication with it and an annulus 26 which in turn is open at its upper end to the interior of the spring housing 16.

The plunger 24 is provided with a reduced portion 27 which serves as a transfer passage connecting the two sets of radial passages 23 and 25 when the plunger is in the raised position. In the drawings the plunger is shown in the normal lowered position with the radial passages isolated from each other. In this position the plunger is held by a spring 28 in the housing 16, the load thereby imposed being adjustable by turning a screwed spindle 29 by means of the handwheel 30 on its upper end.

The plunger 24 on its underside is open to the pressure within the space 13, and when this pressure is sufficient to overcome the load imposed by the spring 28 the plunger 24 moves upwards in its bore until its reduced portion bridges the two sets of radial passages 23 and 25. The fluid on the upper side of the piston 1 is then free to flow into the interior of the housing 16 and so to exhaust. The return movement of the plunger is damped by providing a non-return valve in the form of a ball 31 seating at the upper end of a small axial passage 32 providing a communication between the space 21 and the space on the underside of the plunger 24. As a result of the escape of fluid up the drilled passage 22 the pressure in the space 13 is relieved while the pressure acting against the underside of the piston 1 and plunger 2 remains substantially unchanged. When the pressure differential is sufficient to overcome the light spring 14 the piston moves upwards taking with it the plunger 2 until the passages 8 are uncovered. The pressure liquid on the underside of the piston then escapes to exhaust by way of the annulus 5 and the exhaust outlet 5a. In consequence the pressure will fall and when the pressure drop on the upper side of the piston reaches the point where the plunger 24 closes a condition is obtained that permits the restoration of an equilibrium of pressure on both sides of the piston and the light spring 14 returns the piston and plunger to their normal closed position once more.

The escape of pressure liquid through the various joints in the assembled valve is prevented by rubber or other suitable sealing rings 33.

We claim:

1. An automatic fluid-pressure-operated piston valve structure comprising, in combination, an outer body having a pressure fluid inlet, a cylinder bore open at one end to said inlet and closed at the other end to define a pressure chamber, an internal annular groove formed in the surface of said bore in the portion adjacent said one end, and an outlet opening from said groove, an inner body tightly fitted in said portion of said bore across said groove and having an axial valve bore of less diameter than said cylinder bore and open at one end to said inlet and at the other end to said chamber, and a first set of radial ports in a common transverse plane opening from said valve bore to said groove, a valve member comprising a piston slidably reciprocable in said cylinder bore and presenting a full diametrical outer pressure area and an axial plunger rigid with said piston and slidably reciprocable in said valve bore, said piston presenting an annular pressure area about said plunger in said chamber opposite to said outer pressure area, said plunger having an axial passage open at the free end thereof to said inlet and at the other end to a second set of radial ports in a common transverse plane always in communication with said chamber between said piston and said inner body and defining an effective diametrical inner pressure area, said annular and inner areas substantially equaling said outer area for balance when under equal pressures, the free end of said plunger being disposed in valve relationship with said first set of ports for effecting communication between said inlet and said groove, said piston being formed in the peripheral surface with a helical groove defining a restricted flow passage interconnecting opposite ends of said chamber and adapted to effect a pressure drop incident to flow therethrough, a coiled compression spring in the outer end of said chamber and acting on said piston to bias said valve member in a direction normally to close said first set of ports, and normally-closed valve means operable in response to predetermined pressure conditions in the closed end of said chamber for relieving fluid therefrom to unbalance said valve member, whereby to effect opening of said first set of ports until a reduction in pressure at said inlet again re-establishes said valve member in substantial fluid pressure balance.

2. An automatic fluid-pressure-operated piston valve structure comprising, in combination, an outer body having a pressure fluid inlet, a cylinder bore open at one end to said inlet and closed at the other end to define a pressure chamber, and an outlet opening from said bore, an inner body tightly fitted in one end portion of said bore and having an axial valve bore of less diameter than said cylinder bore and open at one end to said inlet and at the other end to said chamber, first port means opening from said valve bore to said outlet, a valve member comprising a piston slidably reciprocable in said cylinder bore and presenting a full diametrical outer pressure area and an axial plunger rigid with said piston and slidably reciprocable in said valve bore, said piston presenting an annular pressure area about said plunger in said chamber opposite to said outer pressure area, said plunger having a passage open at the free end thereof to said inlet and at the other end to a second port means always in communication with said chamber between said piston and said inner body and defining an effective diametrical inner pressure area, said annular and inner areas substantially equaling said outer area for balance when under equal pressures, the free end of said plunger being disposed in valve relationship with said first port means for effecting communication between said inlet and said outlet, said piston being formed in the peripheral surface with a restricted flow passage interconnecting opposite ends of said chamber and adapted to effect a pressure drop incident to flow therethrough, a coiled compression spring in the outer end of said chamber and acting on said piston to bias said valve member in a direction normally to close said first port means, and normally-closed valve means operable in response to predetermined pressure conditions in the closed end of said chamber for relieving fluid therefrom to unbalance said valve member, whereby to effect opening of said first port means until a reduction in pressure at said inlet again re-establishes said valve member in substantial fluid pressure balance.

3. An automatic fluid-pressure-operated piston valve structure comprising, in combination, a valve body having a pressure fluid inlet, an outlet, a cylinder bore of given diameter, a valve bore of lesser diameter opening axially from said cylinder bore to said inlet, and outlet port means opening from said valve bore to said outlet, a valve member slidably reciprocable in said body and having a piston disposed in said cylinder bore and a valve plunger disposed in said valve bore for controlling communication between said inlet and said outlet port means, said plunger having a longitudinal passage opening from said inlet to said cylinder bore at the contiguous end of said piston and said piston having a helical groove in its peripheral wall defining a passage of restricted flow area opening from one end to the other end thereof, spring means acting on said valve member in a direction to bias said plunger into position to close said outlet port means, the oppositely-acting effective pressure areas of said valve member being substantially equal, and normally-closed valve means operable in response to predetermined pressure conditions in said cylinder bore at the side of said piston remote to said plunger for relieving fluid therefrom to unbalance said valve member whereby to effect opening of said inlet to said outlet port means.

4. An automatic fluid-pressure-operated piston valve comprising, in combination, a valve body having two coaxial bores of different diameter, an exhaust outlet and a pressure fluid inlet open to the smaller of said bores, a valve member slidably reciprocable in said body and having substantially equal pressure areas disposed to act in opposite directions, said valve member comprising a piston in the larger of said bores and a valve plunger in the smaller of said bores, means defining a restricted flow passage between opposite ends of the larger of said bores across said piston, means defining a flow passage connecting said inlet to the larger of said bores at the small side of said piston, the effective area of the free end of said plunger being exposed to the pressure in said inlet, spring means tending to bias said valve member in opposition to the pressure at said inlet so as normally to have said plunger close communication between said inlet and said outlet when the fluid pressures at opposite sides of said piston are substantially equal, normally-closed valve means operable in response to the attainment of a predetermined pressure at said inlet to open so as to relieve the pressure at the large side of said piston whereby to unbalance said valve member and cause said plunger in opposition to said spring means to open communication between said inlet and said outlet, said valve means closing upon a predetermined pressure drop at said inlet, and means for damping the closing of said valve means.

JOHN MAURICE TOWLER.
FRANK HATHORN TOWLER.

References Cited in the file of this patent

UNITED STATES PATENTS

| Number | Name | Date |
|---|---|---|
| 196,106 | Anderson | Oct. 16, 1877 |
| 868,030 | Tanner | Oct. 15, 1907 |
| 869,524 | Schutte | Oct. 29, 1907 |
| 1,660,382 | Hopkins | Feb. 28, 1928 |
| 2,360,816 | Pasco | Oct. 17, 1944 |
| 2,368,754 | Ernst | Feb. 6, 1945 |
| 2,375,410 | Gondek | May 8, 1945 |

FOREIGN PATENTS

| Number | Country | Date |
|---|---|---|
| 359,757 | Italy | of 1938 |